(12) United States Patent
de Jong et al.

(10) Patent No.: US 7,901,147 B1
(45) Date of Patent: Mar. 8, 2011

(54) SPLICE PROTECTOR INSTALLATION TOOL AND METHOD OF USE

(75) Inventors: Michael de Jong, Colleyville, TX (US);
Paul X. Devereaux, Dallas, TX (US);
Daniel Leyva, Jr., Arlington, TX (US);
Ahsan Mazumdar, Keller, TX (US);
Charles A. Yow, Jr., Fort Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/713,863

(22) Filed: Feb. 26, 2010

(51) Int. Cl.
*G02B 6/255* (2006.01)
(52) U.S. Cl. ............................. 385/95; 385/99; 385/134
(58) Field of Classification Search .................. 385/95, 385/99
See application file for complete search history.

(56) References Cited

U.S. PATENT DOCUMENTS

| | | | |
|---|---|---|---|
| 6,033,124 A * | 3/2000 | Lesueur et al. | 385/53 |
| 7,333,709 B2 * | 2/2008 | Carpenter et al. | 385/136 |
| 7,467,899 B2 | 12/2008 | Akiyama | 385/96 |
| 2005/0021668 A1 | 1/2005 | Beesley | 709/217 |

* cited by examiner

*Primary Examiner* — Hemang Sanghavi

(57) ABSTRACT

An installation tool for installing and assembling a splice protector to a spliced region between a fiber optic connector and an optical fiber cable and a method of use are disclosed. Generally, the installation tool comprises a connector bay, a splice protector assembly area, and a cable management mechanism. The connector bay, and the splice protector assembly area, and the cable management mechanism are arranged substantially consecutively and substantially linearly on the workspace. The tool further comprises a cable component retaining feature positioned along and adjacent the workspace so that the retaining feature is proximate adjacent ends of the splice protector assembly area and the cable management mechanism.

24 Claims, 6 Drawing Sheets

SPLICE PROTECTOR INSTALLATION TOOL AND METHOD OF USE

BACKGROUND

The present disclosure generally relates to assembling a splice protector to a splice between a fiber optic connector and an optical fiber, an installation tool for assembling the splice protector, and a method for using the installation tool.

Technicians working in the field to install or repair fiber optic connections are sometimes confronted with challenges. Fiber optic connections are typically made with fusion connectors or mechanical connectors.

For fusion connectors, two fiber ends to be coupled are typically mounted in an instrument that allows for the precision alignment of the two fibers adjacent to one another. At this point, sufficient heat is provided to melt and fuse the cores together. During the fusion process, a number of problems can arise that will result in poor optical connection between the fibers, such as misalignment between the fiber cores as a result of the heating process or even a failure of joining of the two cores during the heating process. These problems are both time consuming and costly.

Often, the process does not end with merely fusing the two optical fibers together. Once the two fibers are joined, a splice protector may be installed. The splice protector encases the spliced region and protects the splice, and incorrect installation of the splice protector can also be costly. The process of fusing two fiber ends and installing the splice protector may require a high level of skill on the part of the technician. In this regard, improved tools and methods are sometimes desired.

SUMMARY

In accordance with one aspect of the present disclosure, an installation tool configured to facilitate the assembly and installation of a splice protector for an optical fiber splice is disclosed. Generally, the installation tool may be a fixture for supporting a fiber optic connector spliced to an optical fiber of a fiber optic cable while the splice protector is installed. The fixture has a base and comprises a support structure, which has an upper workspace. The upper workspace includes a connector bay, a splice protector assembly area and a cable management mechanism. The connector bay, the splice protector assembly area, and the cable management mechanism are arranged substantially consecutively and substantially linearly on the workspace. A cable component retaining feature is positioned along and adjacent the workspace so the retaining feature is proximate adjacent ends of the splice protector assembly area and the cable management mechanism.

In accordance with one example of a method of use, after the fiber optic connector is spliced to the optical fiber, the spliced connection is transferred to the workspace where the connector bay at least partially receives and supports the connector, the splice protector assembly area receives and supports at least a portion of a splice protector, and the cable management mechanism receives and restricts movement of the fiber optic cable.

The present disclosure also describes a method of splicing and mounting a splice protector to a splice. Initially, a cable may be prepared for splicing by sliding a protector nut on a free end of the cable and then removing a portion of an outer jacket of the cable proximate the free end. With the jacket removed, an optical fiber is exposed by folding at least one component of the fiber optic cable back. The optical fiber is spliced to the fiber optic connector to form a spliced optical fiber to fiber optic connector element, which is placed in the installation tool, which is described above. A portion of the fiber optic cable is supported in a channel of the fixture and the spliced optical fiber to fiber optic connector element is arranged on a first portion of the splice protector. The fiber optic connector is supported in a connector bay of the fixture. The fixture further comprises a restraining feature, which arrests the movement of at least one component of the fiber optic cable. A second portion of the splice protector is secured to the first portion of the splice protector to at least partially form the splice protector, while the spliced optical fiber to fiber optic connector element is on the workspace.

The present disclosure further describes a kit for assembly of a splice protector to a spliced region of a fiber optic cable. The kit may include the installation tool and its respective features, as disclosed above, a protector nut, a first portion of a splice protector, a second portion of a splice protector, and a fiber optic connector.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

BRIEF DESCRIPTION OF THE DRAWINGS

The components of the following figures are illustrated to emphasize the general principles of the present disclosure and are not necessarily drawn to scale. Reference characters designating corresponding components are repeated as necessary throughout the figures for the sake of consistency and clarity.

DETAILED DESCRIPTION

Some aspects of the present disclosure are directed to installation of a splice protector for a fiber optic cable spliced to a fiber optic connector. Another aspect of the present disclosure is directed to the installation of splice protectors to any spliced optical fiber connection. Although disclosed in the context of use of installation of a splice protector for a fiber optic cable spliced to a fiber optic connector, the skilled artisan will recognize that the principles of the present disclosure are not limited to installation of a splice protector to a fiber optic cable spliced to a fiber optic connector.

Figure 1:
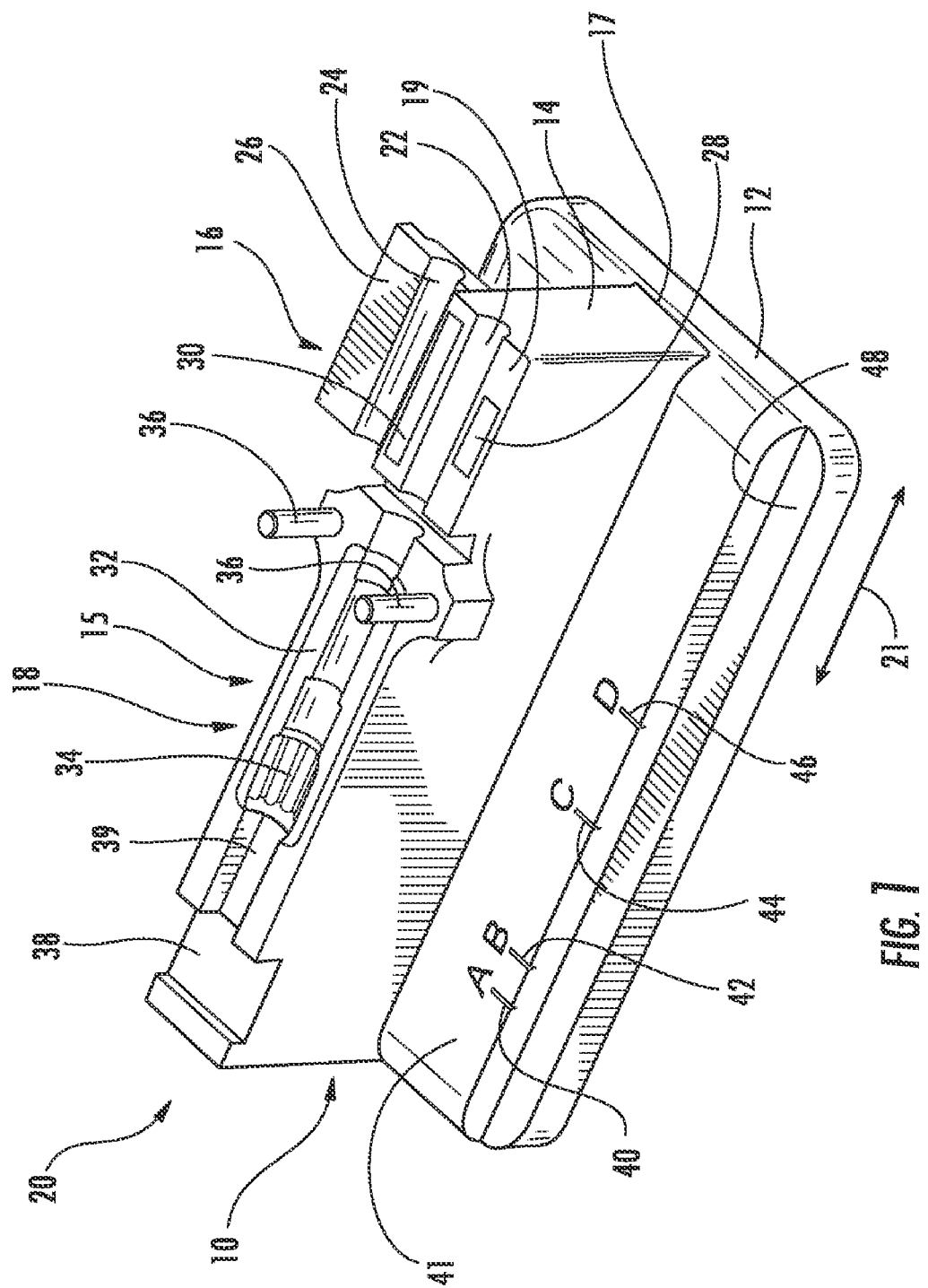
FIG. 1 is an isometric view showing an upper portion of a fiber optic cable splice protector installation tool according to a first embodiment of this disclosure.

FIG. 1 is an isometric view showing an upper portion of a fiber optic cable splice protector installation tool 10, or simply installation tool 10, according to a first embodiment of this disclosure. The installation tool 10 is intended to accommodate a variety of fiber optic connectors, a variety of different splice protectors, and a variety of different fiber optic cable types. For example, the installation tool 10 may accommodate square connector (SC), fiber patch cord (FC) and straight tip (ST®) connectors that are fusion spliced to an optical fiber of a fiber optic cable. Cable sizes ranging from 900 micrometers (μm) up to 4.8 millimeters (mm) in diameter can be accommodated.

The tool 10 is illustrated as having a substantially flat base 12 from which extends a support structure 14. In the first embodiment, the base 12 is generally rectangular in shape. However, the base 12 being rectangular is not required and it can be any shape that best suits the particular application. The support structure 14 is configured for easy access and manipulation of fiber optic hardware by a technician. A lower surface 17 of the support structure 14 is in contact with the base 12 and an upper surface 19 of the support structure 14 is distal to the base 12. A workspace 15 is arranged on the support structure 14 and proximate the upper surface 19. The workspace 15 may be comprised of three primary elements: a cable management mechanism 16; a splice protector assembly area 18; and a connector bay 20. The cable management mechanism 16, and the splice protector assembly area 18, and the connector bay 20 may be arranged substantially consecutively and substantially linearly along the workspace 15 and extend in a longitudinal direction 21.

Figure 4:
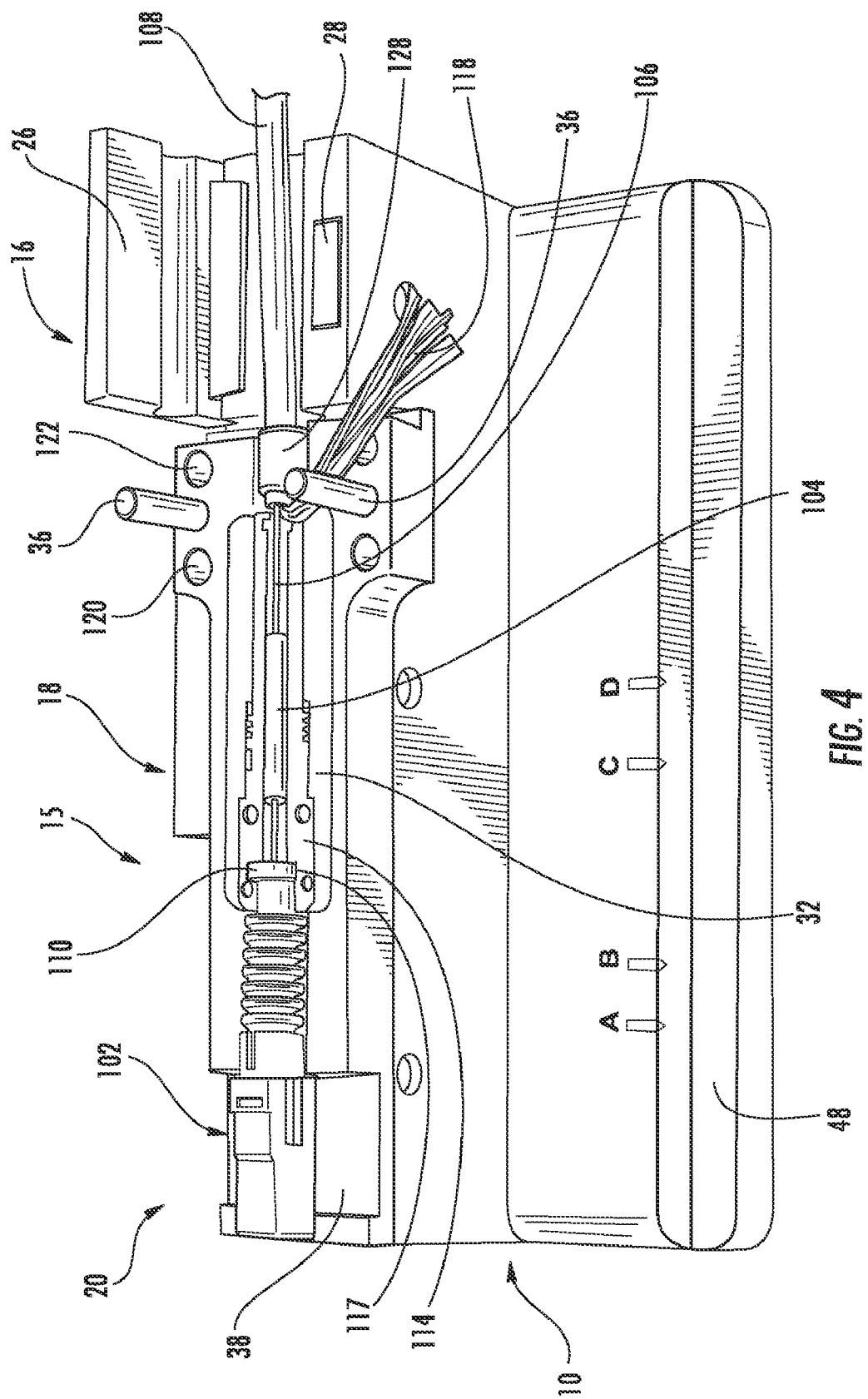
FIG. 4 is an illustration of a fiber optic connector spliced to an optical fiber of a fiber optic cable in situ on a workspace of the cable splice protector installation tool of FIG. 1.
Figure 5:
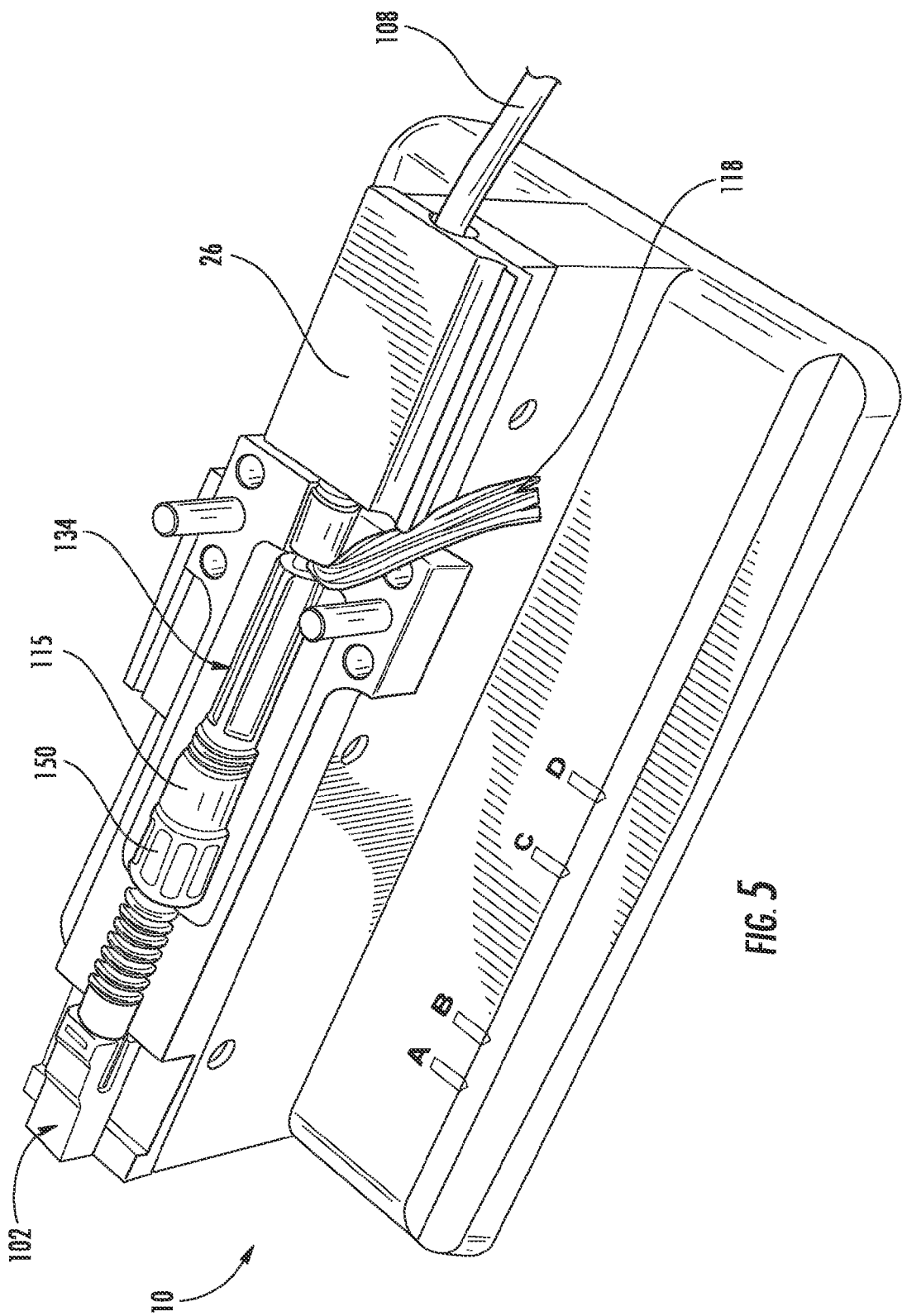
FIG. 5 is an illustration of the fiber optic connector spliced to the optical fiber with the upper portion of the splice protector in place to partially form a splice protector for the spliced region between the fiber optic connector and the fiber optic cable.

The cable management mechanism 16 is primarily intended to receive and restrict movement of a fiber optic cable 108 (FIG. 4) during assembly of a splice protector assembly 134 (FIG. 5). The cable management mechanism 16 includes a semicircular channel 22 that is arranged in the upper surface 19 of the support structure 14 proximate the workspace 15, and extends in the longitudinal direction 21. The semicircular channel 22 may be any size to accommodate the fiber optic cable 108. The cable management mechanism 16 also includes a cable restraint 26, which is attached to the support structure 14. As illustrated, the cable restraint 26 is hingedly connected to the support structure 14 by a hinge 30. The hinge 30 facilitates articulation of the cable restraint 26 between an open position, which is illustrated in FIG. 1, and a closed position. Although the cable restraint 26 is disclosed as being hingedly connected to the support structure 14, it is not required that the connection be a hinged connection and any suitable connection is acceptable that permits articulation of the cable restraint 26 between the open and closed positions. The cable restraint 26 also includes a semicircular channel 24 that extends in the longitudinal direction 21 and is sized to accommodate the fiber optic cable 108. When the cable restraint 26 is in the closed position, the semicircular channels 22, 24 will substantially align to establish a circular passageway or channel, and restrain the fiber optic cable 108 in place. Preferably, the fiber optic cable 108 is circular in cross section and may have a diameter that is at least the same as a diameter of the circular passageway so the fiber optic cable is adequately restrained. More preferably, the diameter of the fiber optic cable 108 is slightly larger that the diameter of the circular passageway to create an interference fit between the fiber optic cable 108 and the circular passageway and still permit the cable restraint 26 to completely close and rest against the upper surface 19 of the support structure 14. Nonetheless, other configurations are within the scope of this disclosure. Interchangeable inserts (not shown) may be used with the cable management mechanism 16 in order to accommodate a variety of different cable types and sizes.

A restraining feature 28 may be located in the upper surface 19 of the support structure 14 and functions to secure the cable restraint 26 in the closed position while the workspace is being utilized, while the installation tool 10 is being transported or stored, or during any activity that may require the cable restraint 26 to be secured in the closed position. As illustrated, the restraining feature 28 is a magnet that is arranged substantially flush with the upper surface 19. The restraining feature 28 may be any feature that will secure the cable restraint 26 in the closed position and not necessarily need to be flush with the upper surface 19.

The splice protector assembly area 18 is arranged adjacent the cable management mechanism 16 in the longitudinal direction 21. The splice protector assembly area 18 at least partially receives and supports at least a portion of the splice protector assembly 134. The splice protector assembly area 18 also includes an elastomeric insert 32, which is inserted into a recess in the upper surface 19 of the support structure 14. The elastomeric insert 32 supports a portion of the splice protector. Furthermore, the elastomeric insert 32 is produced so it may have an exterior profile 34 of a portion of the splice protector molded into the insert 32. The elastomeric insert 32 is interchangeable with differently configured inserts. This enhances the functionality of the installation tool 10 since elastomeric inserts for a wide variety of splice protectors may be produced and used with the installation tool 10, thus eliminating the necessity of having a different tool for each splice protector exterior profile.

The elastomeric insert 32 is fabricated from an elastomeric material. Acceptable elastomeric materials, for example, may be rubber or silicone, and they are generally considered to be softer materials. One such elastomeric material suitable for use is Santoprene. The elastomeric material offers improved gripping abilities over other materials and can readily be molded to have a wide variety of shapes and sizes.

Still referring to FIG. 1, a cable component retaining feature 36 is positioned along and adjacent the workspace 15 so that the retaining feature 36 is proximate adjacent ends of the splice protector assembly area 18 and the cable management mechanism 16. As illustrated, the retaining feature 36 extends upward from the upper surface 19 of the support structure 14 and functions to restrain a cable component, such as an aramid yarn. It is not required that the retaining feature 36 extend upward from the upper surface 19, but is this one of many acceptable configurations for satisfying the function of retaining a cable component during installation and assembly of the splice protector. For example, the retaining feature 36 may be a clip, an eyelet, a clamp, or a hook, or any combination thereof.

The connector bay 20 partially receives and supports the fiber optic connector 102 (FIG. 4). The connector bay 20 is adjacent the splice protector assembly area 18 in the longitudinal direction 21. The connector bay 20 may have a recessed portion 38 and a recessed channel 39. The recessed channel 39 extends generally in the longitudinal direction 21 and from the splice protector assembly area 18 to the recessed portion 38. The recessed portion 38 and the recessed channel 39 function cooperatively to receive a portion of the fiber optic connector 102. This allows the fiber optic connector 102 to be positioned properly and proper installation and assembly of the splice protector assembly 134. A cross section of the recessed portion 38 in a direction perpendicular to the longitudinal direction 21 and a cross section of the recessed channel 39 in the longitudinal direction 21 are both rectangular in the first embodiment. There is no requirement that both, or either, of the cross sections be rectangular and either cross section may be any shape so long as the fiber optic connector can be adequately supported while the splice protector is being installed. The connector bay 20 can accommodate a variety of connector geometries and connector types. Different interchangeable inserts (not shown) can be installed or inserted in the connector bay 20 to accommodate the variety of connector geometries and types.

With continued reference to FIG. 1, a plurality of cable marking and measuring locations 40, 42, 44, 46 are arranged on a top surface 41 of the base 12 and spaced at pre-determined distances from each other. The marking and measuring locations 40, 42, 44, 46 may used by the technician as a guide for measuring and marking the fiber optic cable 108 at an appropriate location when preparing the cable 108 for splicing. For example, a portion of the cable 108 to be measured and marked may be placed on a shelf 48, which is arranged in the base 12 and adjacent marking and measuring locations 40, 42, 44, 46. When the cable 108 is properly positioned, the cable 108 is marked at the appropriate location, which will depend on the type of cable being spliced and possibly the type of splicing operation. Properly positioning the cable 108 is intended to mean placing a free end of the cable 108 at one of the marking and measuring locations 40, 42, 44, 46 and marking the cable 108 at a different marking location, thereby establishing a marked length of cable. Properly positioning the cable 108 is also intended to mean aligning a feature on the cable, such as a heat shrink tube, relative to one of the marking and measuring locations 40, 42, 44, 46 and marking the cable 108 at a different marking location thereby establishing a marked length of cable. Other variations and means to establish a marked length of cable are possible. Additionally, marking a portion of the cable 108 and stripping a portion of an outer jacket of the cable 108 may be characterized as being part of the process to prepare the cable for splicing.

Figure 2:
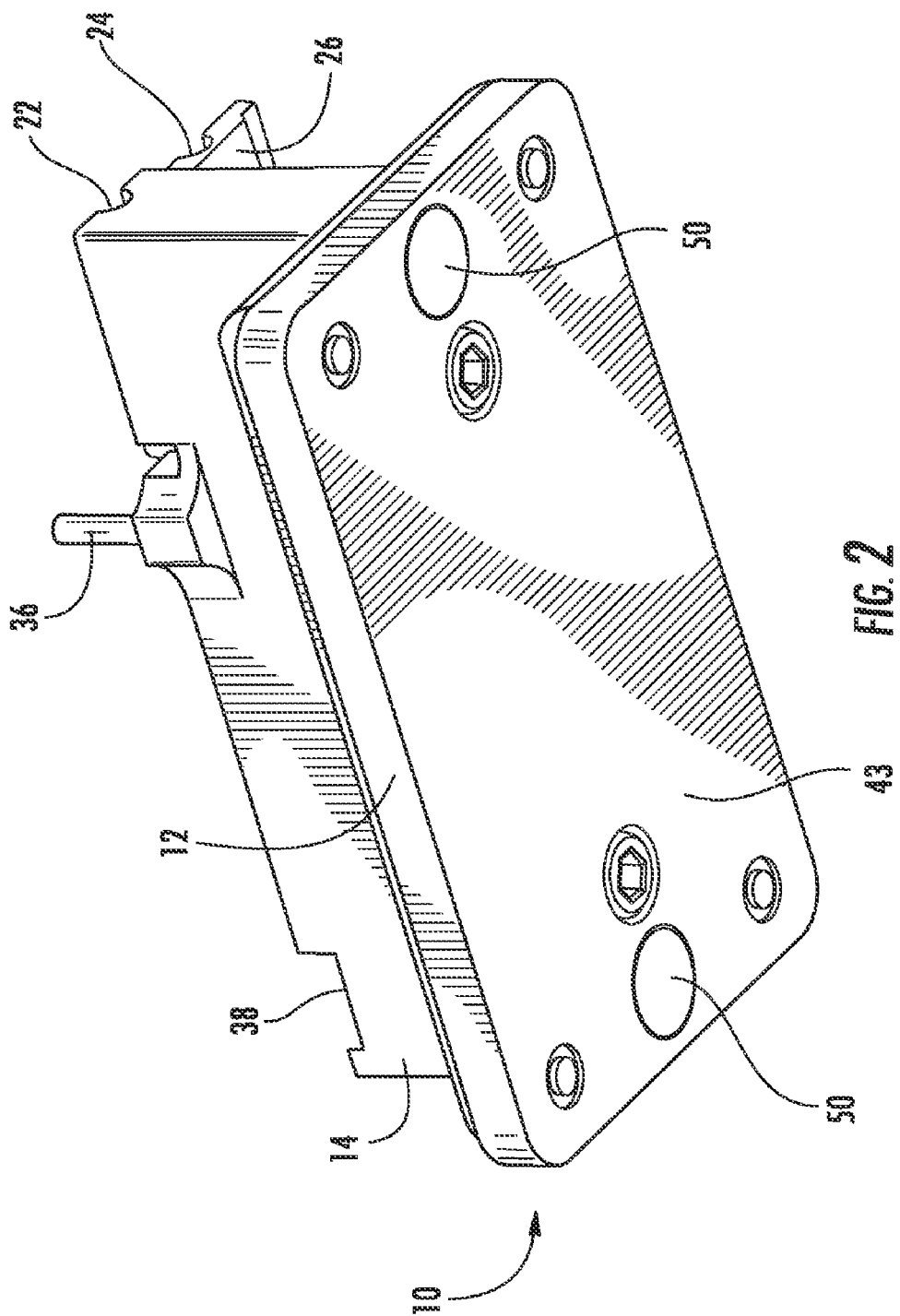
FIG. 2 is an isometric view showing a lower portion of the fiber optic cable splice protector installation tool of FIG. 1 according to the first embodiment of this disclosure.

FIG. 2 is an isometric view showing a lower portion of the fiber optic cable splice protector installation tool 10 of FIG. 1. An installation tool mounting feature 50 is located proximate a lower surface 43 of the base 12. The installation tool mounting feature 50 is for securing the installation tool 10 to a structure (not shown). As illustrated, the installation tool mounting feature 50 is a plurality of magnets. It is not required that the installation tool mounting feature 50 be a magnet and any mounting feature will work, such as a clamp, for example. Furthermore, it is not required that the installation tool mounting feature 50 be located proximate the lower surface 43 of the base 12 and may be located at any location on the tool 10 that is practical or convenient.

The installation tool 10 can be fabricated from any suitable material such as stainless steel, aluminum, or any metal alloy. Furthermore, the installation tool 10 may be produced by any acceptable manufacturing technique such as casting, forging, machining, fabricating, or any combinations thereof. If desired, the installation tool 10 may be molded or formed from a plastic or polymer material.

Figure 3:
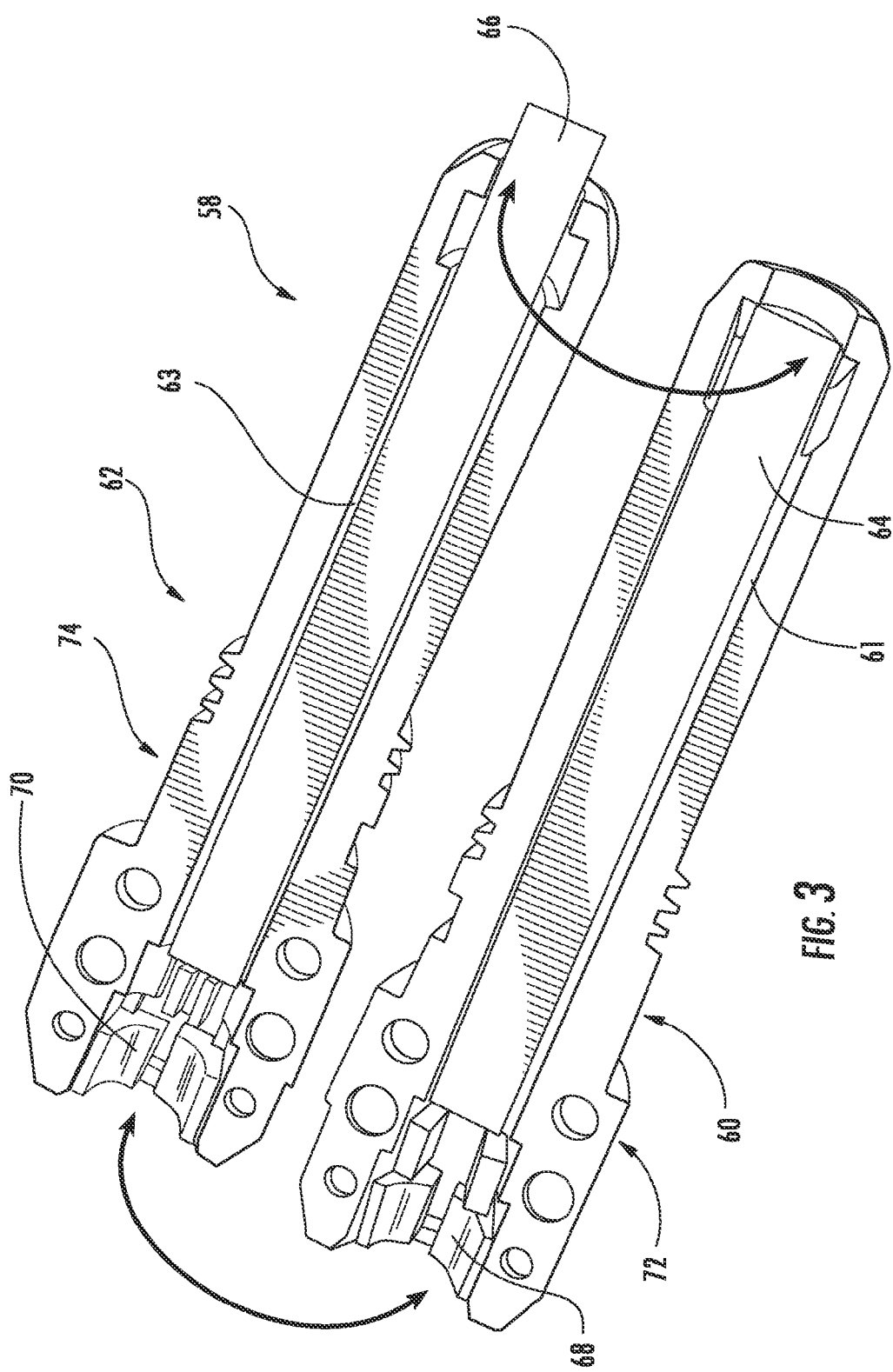
FIG. 3 is an exploded view showing a lower portion and an upper portion of a splice protector.

An exploded view of a typical splice protector assembly 58 is illustrated in FIG. 3. The splice protector assembly 58 comprises a splice protector first portion 60, or lower half 60, and a splice protector second portion 62, or upper half 62. The splice protector first portion 60 and the splice protector second portion 62 may each have an adhesive liner 64, 66, respectively. The adhesive liner 64, 66 covers an adhesive that is applied to a surface 61 of the splice protector first portion 60 and a surface 63 of the splice protector second portion 62 and may protect the adhesive during storage or shipment. The adhesive liner 64, 66 is removed during a splice protector assembly process and when the splice protector first portion 60 is mated with the splice protector second portion 62, the adhesive aids in securing the spliced region of the cable in position.

For the splice protector assembly 58 as illustrated, the splice protector first portion 60 and the splice protector second portion 62 each have a recessed portion 68, 70, for receiving a boot 110, or boot key 110, of the fiber optic connector 102 (FIG. 4). The recessed portion 68, 70 may be referred to as a key slot. The recessed portion 68, 70 functions to align and orient the fiber optic connector 102 relative to the splice protector first portion 60 and the splice protector second portion 62 for proper splice protector assembly as well as helping to properly position the spliced region 104 (FIG. 4). The splice protector first portion 60 and the splice protector second portion 62 also have an exterior profile 72, 74, respectively. Exterior profile 72 and exterior profile 74 may be the same and will align when the splice protector first portion 60 and the splice protector second portion 62 are mated. However, the exterior profile 72, 74 of the splice protector assembly 58 may be different, for different splice protector assemblies. The elastomeric insert 32 (FIG. 1) is produced so it may have the exterior profile 72, 74 of the splice protector first portion 60 or the splice protector second portion 62 molded into the insert 32. Thus, the elastomeric insert 32 receives and supports a portion of either the splice protector first portion 60 or the splice protector second portion 62 during the splice protector assembly process.

A method of using the installation tool 10 is described in the following, in accordance with the first embodiment. FIG. 4 is an illustration of a fiber optic connector 102 spliced to an optical fiber 106 of a fiber optic cable 108 in combination with the cable splice protector installation tool 100 of FIG. 1. The fiber optic connector 102, and the spliced region 104 and the fiber optic cable 108 are illustrated upon on the workspace 15. The term "spliced region" used throughout the detailed description section of this document will be understood by the skilled artisan to mean a portion of optical fiber of the fiber optic connector 102 that has been spliced to a portion of optical fiber 106 of the fiber optic cable 108. A portion of the fiber optic connector 102 is supported by the connector bay 38. A boot portion 110, or boot key 110, of the fiber optic connector 102 is supported by a key slot 117 of the splice protector first portion 114 of the splice protector assembly 134. The splice protector first portion 114 is supported by the elastomeric insert 32.

During assembly of the splice protector assembly 134, the spliced region 104 is arranged on the splice protector first portion 114. The fiber optic cable 108 is supported and retained by the cable management mechanism 16, which includes the cable restraint 26. The cable restraint 26 as illustrated in an open position in FIG. 4. In this particular embodiment, a heat shrink tube 128 is installed on the fiber optic cable 108. A fiber optic component 118 is retained by a cable component retaining feature 36. As illustrated, the fiber optic component 118 is an aramid yarn and the cable component retaining feature 36 is an adjustable post that extends upward from the workspace 15. The cable component retaining feature 36 may be moved to alternate locations 120, 122 (e.g. receptacles). The alternate locations 120, 122 may be utilized depending on the type of fiber optic cable 108 that is being spliced. The cable component retaining feature 36 seeks to allow an individual technician to assemble the splice protector assembly thereby typically eliminating the need for additional technicians to participate in the assembly. The restraining feature 28, arranged on the workspace 15 secures the cable restraint 26 in a closed position (FIG. 5) to restrain the fiber optic cable 108 in place during assembly of the splice protector assembly 134.

FIG. 5 shows the fiber optic connector 102 spliced to the optical fiber 106 with a splice protector second portion 115 mated to the splice protector first portion 114 (FIG. 4) partially forming the splice protector assembly 134 for the spliced region between the fiber optic connector 102 and the fiber optic cable 108. The cable restraint 26 is illustrated in a closed position, securing the fiber optic cable 108 in place. The splice protector second portion 115 may also have an adhesive to help hold the splice protector first and second portions 114, 115, respectively, together. An outer surface of the splice protector second portion 115 may have ridges 150 or ribs 150. The ridges 150 facilitate removal of the splice protector assembly 134 from the installation tool 10. The cable restraint 26 is articulated to the open position for removal of the splice protector assembly.

Figures 6, 7:
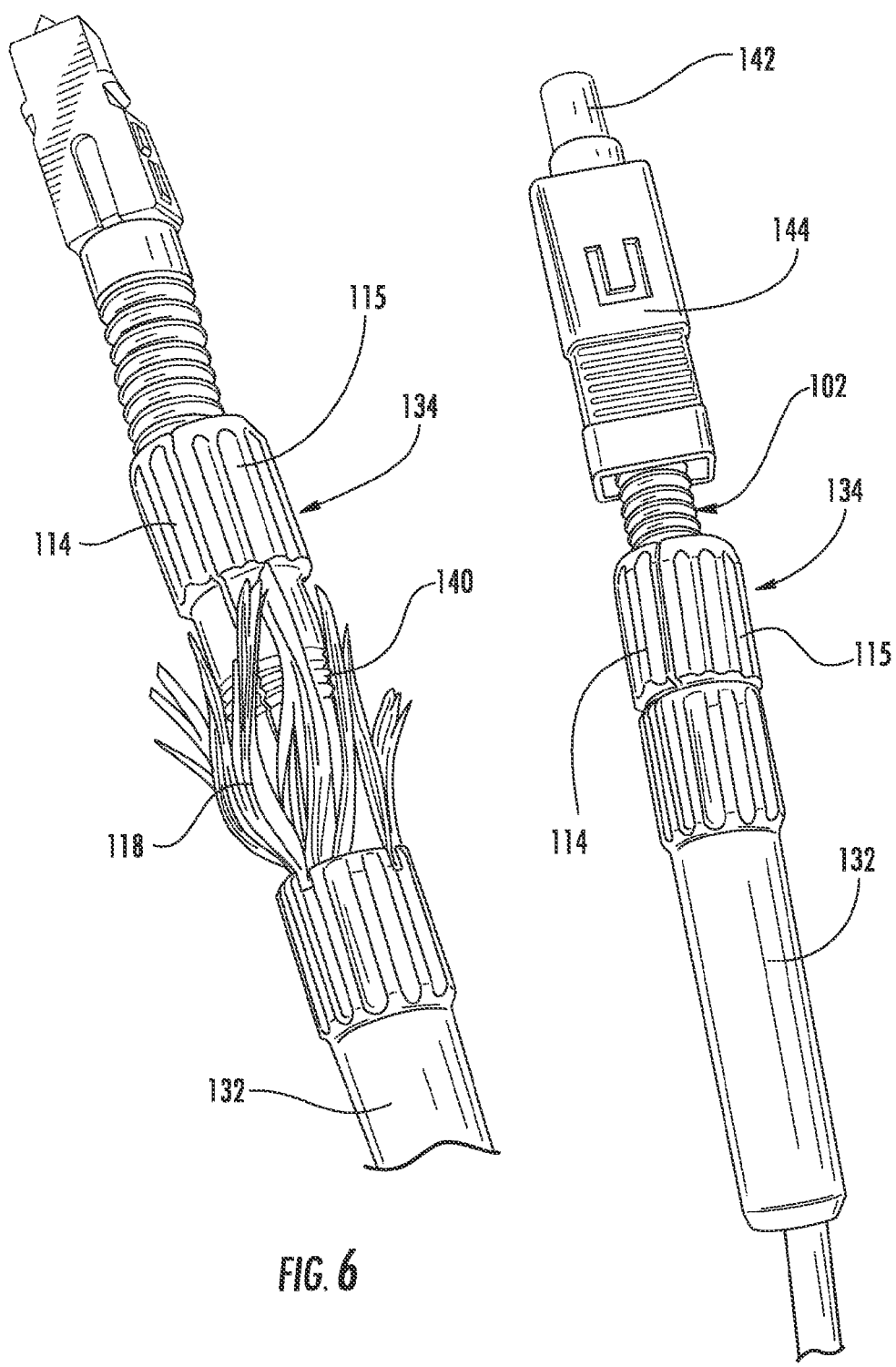
FIG. 6 shows a protector nut being threaded onto the splice protector of FIG. 5 and an aramid yarn being evenly distributed around the splice protector.
FIG. 7 is an illustration of a final assembly of the splice protector.

FIG. 6 illustrates a protector nut 132 being threaded onto the splice protector assembly 134 and an aramid yarn 118 being evenly distributed around the splice protector. The protector nut 132 secures the splice protector first portion 114 and splice protector second portion 115 together. The aramid yarn 118 around the splice protector assembly 134 aids in protection of the components. The splice protector assembly 134 has a threaded region 140, to receive the protector nut 132. Additionally, the aramid yarn 118 further couples the cable 108 to the splice protector assembly 134, thereby imparting an improved pull strength when cable 108 and splice protector assembly 134 are assembled. Excess ends of the aramid yarn 118 may be trimmed and removed if necessary.

FIG. 7 is an illustration of the completed splice protector assembly 134. The splice protector assembly 134 is illustrated with a dust cap 142 and shroud 144 in place on the fiber optic connector 102 and the protector nut 132 completely threaded on the splice protector first portion 114 and splice protector second portion 115.

Further regarding an example of a method of assembling a splice protector to a spliced region between a fiber optic connector spliced to an optical fiber of a fiber optic cable. One or more of the following actions may be taken. The cable 108 may be initially prepared for splicing by sliding a protector nut 132 on a free end of the cable 108 and away from the free end. Depending on the type of cable being spliced, use of a heat shrink tube 128 may also be desired. The heat shrink tube 128 may also be slid on the free end of the cable 108 and away from the free end. A portion of the cable extending from the free end and along the cable is typically cleaned with alcohol or other cleaning agent. At this stage in the installation process, the method diverges depending on whether the cable either requires, or does not require, the heat shrink tube 128.

For installations not requiring a heat shrink tube, the cable 108 may next be placed on the shelf 48 of the installation tool 10 with the free end of the cable aligned with measuring mark "C" 44 and the cable 108 extending along the shelf 48 toward the measuring mark "A" 40. A mark may be made on the cable 108 at measuring mark "A" 40. The cable jacket and any coating are stripped from the mark to the free end of the cable, further to expose the optical fiber 106.

For installations utilizing a heat shrink tube 128, the heat shrink tube 128 is slid onto the cable to a fixed distance from the free end of the cable. The fixed distance may be, for example, about 2 inches. The heat shrink tube is cured in place. The cable is next placed on the shelf 48 of the installation tool 10 with the end of the heat shrink tube closest the free end of the cable aligned with measuring mark "A" 40 and the cable 108 extending along the shelf 48 toward the measuring mark "D" 46. A mark is made on the cable at measuring mark "D" 46 and the cable is cut and the portion of cable extending from the mark to the free end is discarded. Next, aramid yarn 118 is pulled back exposing a jacketed cable. The cable 108 is again placed on a shelf 48 of the installation tool 10 with the end of the heat shrink tube closest the free end of the cable aligned with measuring mark "A" 40 and the jacketed cable extending along the shelf 48 toward the measuring mark "B" 42. The cable jacket is stripped from the mark to the free end of the cable, further to expose the optical fiber 106.

With the optical fiber 106 exposed, the optical fiber 106 is spliced to the optical fiber of the fiber optic connector. The splicing process may be carried out using a conventional fusion splicing. The optical fiber of the fiber optic cable spliced to the fiber optic protector forms the spliced optical fiber to fiber optic connector element.

The elastomeric insert 32 is placed in the installation tool 10 and the first portion of the splice protector 114 is arranged so the elastomeric insert 32 is supporting at least a portion of the first portion of the splice protector 114. An adhesive liner is removed from the first portion of the splice protector 114 to expose an adhesive. The spliced optical fiber to fiber optic connector element is then placed on the workspace 15 of the installation tool 10, as illustrated in FIG. 4. A portion of the fiber optic cable 108 is placed in the semi-circular channel 22 of the cable management mechanism 16 and the spliced region 104 of the spliced optical fiber to fiber optic connector element is arranged on the adhesive of the first portion of the splice protector 114, which is supported in the elastomeric insert 32. The fiber optic connector 102 is supported in the connector bay 20 of the installation tool 10. The fiber optic connector 102 comprises the connector boot 110, which is seated in the key slot 117 (FIG. 4) of the first portion of the splice protector 114.

While the spliced optical fiber to fiber optic connector element is on the workspace 15, at least one component of the fiber optic cable 118, such as aramid yarn 118, may have its movement arrested by the restraining feature 36 of the installation tool 10.

An adhesive liner may be removed from the second portion of the splice protector 115 and the second portion of the splice protector 115 may secured to the first portion of the splice protector 114 to at least partially form the splice protector assembly 134, while the spliced optical fiber to fiber optic connector element is on the workspace 15. A periphery of the first portion of the splice protector 114 may align with a periphery of the second portion of the splice protector 115. The spliced optical fiber to fiber optic connector element with the splice protector assembly 134 in place may be removed from the workspace 15 of the installation tool 10.

The at least one component of the fiber optic cable 118 (e.g. aramid yarns) is spread substantially evenly around a threaded portion 140 of the splice protector assembly 134. The protector nut 132 may then be thread onto the threaded portion 140 of the splice protector assembly. A dust cap 142 and a shroud 144 may be installed on the fiber optic connector to complete installation of the splice protector assembly 134.

Throughout the foregoing disclosure, the adjective "about" has been used in numerous locations preceding an amount.

Other embodiments of this disclosure are like the above-discussed embodiments, except that the adjective "about" is optional and may be omitted.

It will be apparent to those skilled in the art that various modifications and variations can be made without departing from the spirit or scope of the present disclosure.

We claim:

1. A fixture for holding a fiber optic connector spliced to an optical fiber of a fiber optic cable, the fixture comprising:
    a support structure including an upper workspace, the workspace comprising,
        a connector bay for at least partially receiving and supporting the fiber optic connector,
        a splice protector assembly area for receiving and supporting at least a portion of a splice protector,
        a cable management mechanism for receiving and restricting movement of the fiber optic cable; and
    a cable component retaining feature positioned along and adjacent the workspace so that the retaining feature is proximate adjacent ends of the splice protector assembly area and the cable management mechanism,
    wherein the connector bay, and the splice protector assembly area, and the cable management mechanism are arranged substantially consecutively and substantially linearly on the workspace.

2. The fixture as claimed in claim 1, further comprising a base supporting the support structure, and a fiber optic cable support shelf proximate an upper surface of the base, the fiber optic cable support shelf having a plurality of markings for measuring.

3. The fixture as claimed in claim 1, further comprising a base supporting the support structure, and a magnet mounted to the base for securing the fixture to a structure.

4. The fixture as claimed in claim 1, wherein the cable management mechanism comprises:
    a semicircular channel for receiving and supporting the cable, wherein the channel is positioned in the workspace of the support structure; and
    a cable restraint hingedly connected to the support structure.

5. The fixture as claimed in claim 4, wherein the cable management mechanism comprises a magnet for securing the cable restraint in a closed position, wherein the magnet is positioned between the cable restraint and the support structure while the cable restraint is in the closed position.

6. The fixture as claimed in claim 1, wherein the splice protector assembly area comprises an elastomeric insert for at least partially receiving and supporting the at least portion of the splice protector.

7. The fixture as claimed in claim 6, wherein the elastomeric insert is adapted for restricting rotation of the at least portion of the splice protector.

8. The fixture as claimed in claim 1, wherein the connector bay is a recessed connector bay.

9. The fixture as claimed in claim 1, wherein the cable component retaining feature extends upwardly from an upper surface of the support structure of the workspace.

10. A method of splicing a fiber optic connector to an optical fiber of a fiber optic cable and then mounting a splice protector to the splice, comprising:
    preparing the fiber optic cable to be spliced to the fiber optic connector, comprising removing a portion of an outer jacket of the cable proximate the free end, folding at least one component of the fiber optic cable back to expose the optical fiber;
    splicing the optical fiber to the fiber optic connector to form a spliced optical fiber to fiber optic connector element;
    placing the spliced optical fiber to fiber optic connector element on a workspace of a universal fixture, comprising,
        supporting a portion of the fiber optic cable in a channel of the universal fixture,
        arranging the spliced optical fiber to fiber optic connector element on a first portion of the splice protector,
        supporting the fiber optic connector in a connector bay of the universal fixture,
        restraining the at least one component of the fiber optic cable, comprising arresting movement of the at least one component with a restraining feature of the universal fixture; and
    securing a second portion of the splice protector to the first portion of the splice protector to at least partially form the splice protector, while the spliced optical fiber to fiber optic connector element is on the workspace.

11. The method of claim 10, comprising supporting the first element of the splice protector on an elastomeric insert that is contacting the workspace of the universal fixture during the arranging of the spliced optical fiber to fiber optic connector element on the first portion of the splice protector.

12. The method of claim 11, further comprising removing the splice protector, the fiber optic connector, and the fiber optic cable from the universal fixture and spreading the at least one component of the fiber optic cable substantially evenly around a threaded portion of the splice protector.

13. The method of claim 12, wherein the at least one component of the fiber optic cable is a yarn.

14. The method of claim 12, further comprising threading a protector nut onto the threaded portion of the splice protector.

15. The method of claim 14, further comprising installing a dust cap and a shroud to the fiber optic connector.

16. The method of claim 10, further comprising measuring the portion of the outer jacket of the cable to be removed, the measuring comprising using markings on a base of the universal fixture, and measuring occurring before the removing the portion of the outer jacket.

17. The method of claim 10, further comprising sliding a heat shrink tube on the free end of the cable to a predetermined distance from the free end, and then curing the heat shrink tube.

18. The method of claim 10, wherein the arranging of the spliced optical fiber to fiber optic connector element on the first portion of the splice protector further comprises seating a connector boot key of the fiber optic connector in a key slot of the first portion of the splice protector.

19. A kit for assembling a splice protector to a spliced fiber optic cable, comprising:
    a first element of the splice protector;
    a second element of the splice protector;
    a fiber optic connector; and
    a fixture comprising:
        a support structure including an upper workspace, the workspace comprising,
            a connector bay for at least partially receiving and supporting the fiber optic connector,
            a splice protector assembly area for receiving and supporting a first element of the splice protector,
            a cable management mechanism for at least partially receiving and restricting movement of the fiber optic cable;
        a cable component retaining feature positioned along and adjacent the workspace so that the retaining feature is proximate adjacent ends of the splice protector assembly area and the cable restraining area, wherein the connector bay, and the splice protector assembly area, and the cable management mechanism are arranged substantially consecutively and substantially linearly on the workspace.

20. The kit as claimed in claim 19, further comprising a protector nut.

21. The kit as claimed in claim 20, further comprising a compatible optical fiber fusion splicer.

22. The kit as claimed in claim 20, further comprising a heat shrink tube that is in communication with the fiber optic cable when the heat shrink tube is installed.

23. The kit as claimed in claim 19, wherein the fixture further comprises an elastomeric insert for at least partially receiving and supporting the first element of the splice protector.

24. The kit as claimed in claim 19, wherein the cable management mechanism further comprises:
- a semicircular channel for receiving and supporting the cable, wherein the channel is positioned in the workspace of the support structure; and
- a cable restraint hingedly connected to the support structure.

* * * * *